(12) United States Patent
Yamazaki et al.

(10) Patent No.: US 7,438,676 B2
(45) Date of Patent: Oct. 21, 2008

(54) AUTOMATIC TOOL CHANGER OF LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 11/768,247

(22) Filed: Jun. 26, 2007

(65) Prior Publication Data

US 2008/0053976 A1 Mar. 6, 2008

(30) Foreign Application Priority Data

Aug. 29, 2006 (JP) .............................. 2006-232341

(51) Int. Cl.
*B23Q 3/157* (2006.01)

(52) U.S. Cl. .................. 483/16; 483/14; 219/121.84

(58) Field of Classification Search .................. 483/3, 483/16, 59, 60, 61, 62; 219/121.6, 12.67, 219/121.68, 121.73, 121.74, 121.75, 121.83; 29/557, 563

See application file for complete search history.

(56) References Cited

U.S. PATENT DOCUMENTS

| | | | | |
|---|---|---|---|---|
| 5,854,460 | A * | 12/1998 | Graf et al. | 219/121.67 |
| 7,129,441 | B2 * | 10/2006 | Yamazaki et al. | 483/16 |
| 7,169,100 | B2 * | 1/2007 | Yamazaki et al. | 483/16 |
| 2002/0153358 | A1 * | 10/2002 | Inoue et al. | 219/121.6 |
| 2004/0167001 | A1 * | 8/2004 | Hagihara et al. | 483/7 |
| 2004/0176229 | A1 * | 9/2004 | Soroka et al. | 483/14 |
| 2005/0178749 | A1 * | 8/2005 | Yamazaki et al. | 219/121.62 |
| 2005/0178753 | A1 * | 8/2005 | Yamazaki et al. | 219/121.78 |
| 2005/0263508 | A1 * | 12/2005 | Yamazaki et al. | 219/121.84 |
| 2005/0263509 | A1 * | 12/2005 | Yamazaki et al. | 219/121.84 |
| 2005/0263510 | A1 * | 12/2005 | Yamazaki et al. | 219/121.84 |
| 2005/0266974 | A1 * | 12/2005 | Yamazaki et al. | 483/16 |
| 2007/0000888 | A1 * | 1/2007 | Yamazaki et al. | 219/121.78 |

FOREIGN PATENT DOCUMENTS

| | | |
|---|---|---|
| JP | 07-185865 | 7/1995 |
| JP | 2005-081448 | 3/2005 |
| JP | 2005-096063 | 4/2005 |
| JP | 2005-334920 | 12/2005 |
| JP | 2005-334921 | 12/2005 |

OTHER PUBLICATIONS

Japanese Office Action for corresponding Application No. 2006-232341 dated Jun. 2, 2008.

* cited by examiner

*Primary Examiner*—Dana Ross
(74) *Attorney, Agent, or Firm*—Renner, Otto, Boisselle & Sklar, LLP

(57) ABSTRACT

The invention provides a torch changer with a large capacity for a flying optics-type laser beam machine. A table 15 of the laser beam machine is fixed, and a laser beam working head 50 moves in three axial directions. A torch changing unit 300 is disposed on a setup station 90 disposed outside the processing area at the end of the table. A torch storing device 100 stores a large number of torch holders 150 supported by forks on the outer side of a chain 130. A torch holder shifter 200 sends out the torch holder 150 positioned at a shift position towards the torch changing unit 300, where the torch attached to the working head 50 is changed.

5 Claims, 17 Drawing Sheets

Figs. 5(a) and 5(b)
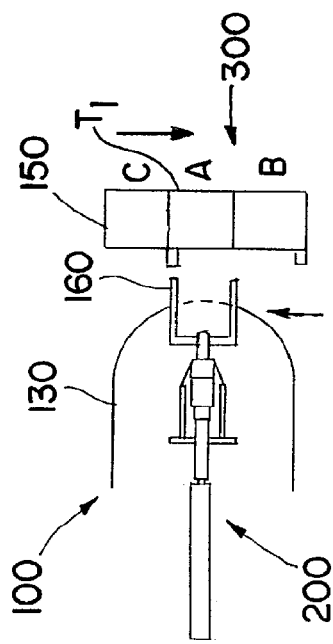
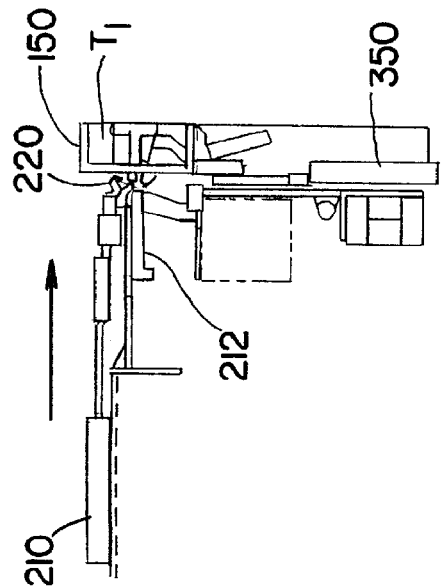
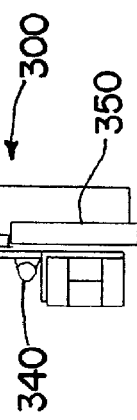
(a) MOVE USED TORCH HOLDER TO TORCH CHANGING POSITION A.
ROTATE MAGAZINE AND ALLOCATE RETURN HOLDER POSITION.
(b) MOVE SHIFT CYLINDER FORWARD TO RECEIVE TORCH.

(d) RETURN USED TORCH TO MAGAZINE.

(c) LOWER JAW TO GRIP HOOK OF TORCH HOLDER.

Figs. 6(g) and 6(h)
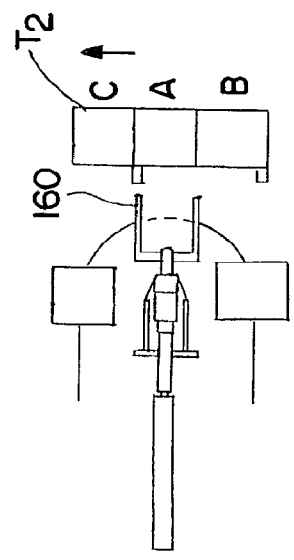
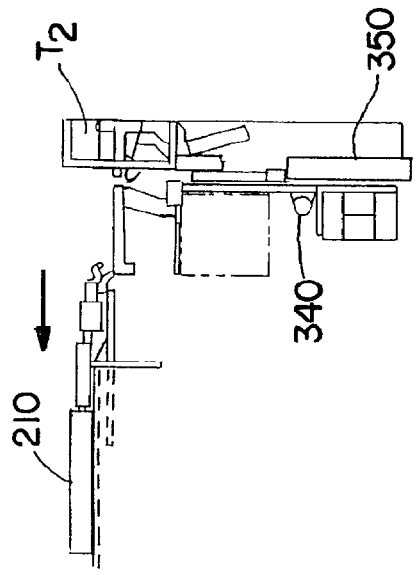
(g)
MOVE SHIFT CYLINDER FORWARD TO SET TORCH TO ATC POSITION.
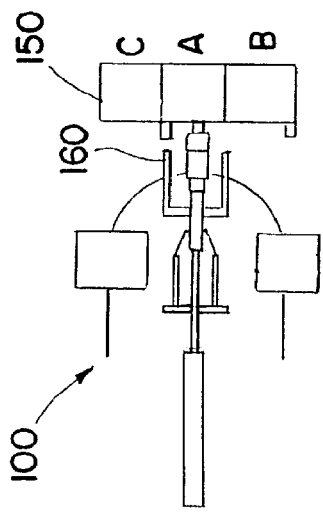
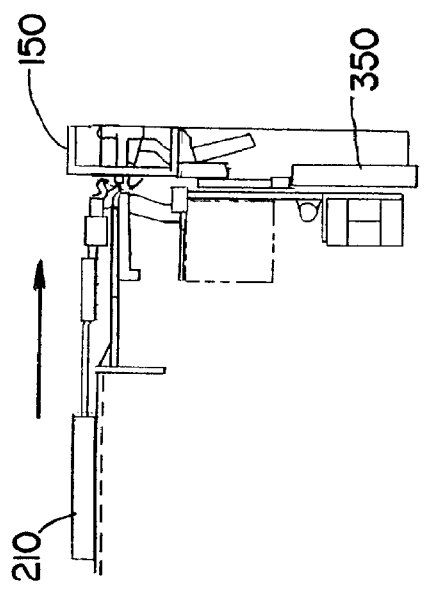
(h)
RETURN SHIFTER TO STANDBY POSITION, MOVE HOLDER TO BE USED NEXT TO POSITION C FOR STANDBY UNTIL NEXT ATC.

(j) OPEN TORCH COVER HALF WAY (TO AVOID INTERFERENCE WITH TORCH).

(i) UPON RECEIVING ATC ORDER, RAISE VACANT HOLDER IN POSITION A.

Figs. 8(o) and 8(p)
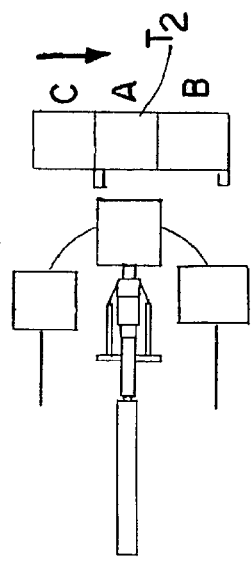
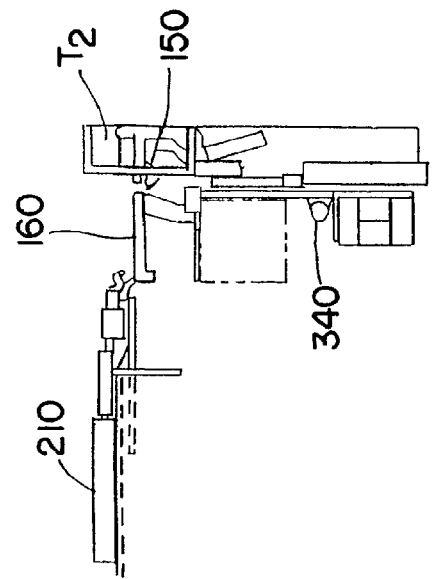
(p) MOVE TORCH HOLDER TO BE USED NEXT TO POSITION A.
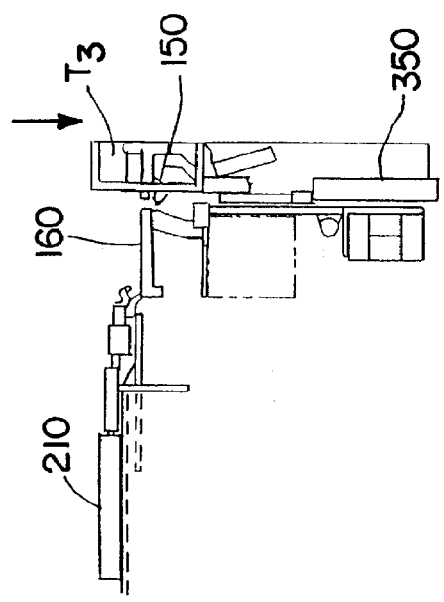
(o) LOWER TORCH HOLDER.

(u) MOVE HEAD TO PROCESSING POSITION.

(v) CLOSE TORCH COVER TO HALF OPEN STATE.

(x) LOWER VACANT TORCH HOLDER.

(w) CLOSE TORCH COVER COMPLETELY.

AUTOMATIC TOOL CHANGER OF LASER BEAM MACHINE

The present application is based on and claims priority of Japanese patent application No. 2006-232341 filed on Aug. 29, 2006, the entire contents of which are hereby incorporated by reference.

BACKGROUND OF THE INVENTION

1. Field of the Invention

The present invention relates to an automatic tool changer of torches and nozzles of a laser beam machine.

2. Description of the Related Art

A laser beam machine having an apparatus for automatically changing tools such as torches and nozzles is disclosed for example in Japanese Patent Application Laid-Open Publication Nos. 2005-334920 (patent document 1) and 2005-334921 (patent document 2) filed by the present applicant.

The laser beam machine disclosed in patent documents 1 and 2 has a so-called flying optics structure in which the laser beam working head moves along path lines of three axes, an X axis, a Y axis and a Z axis.

SUMMARY OF THE INVENTION

The object of the present invention is to provide a laser beam machine having a structure similar to that disclosed in patent documents 1 and 2, equipped with an automatic tool changer having a magazine capable of holding a large number of torches and nozzles to be exchanged, and capable of being installed in a small space.

The object of the present invention is realized by providing a torch changing unit disposed on an end portion of the bed outside a processing area, a torch storing device disposed adjacent to the torch changing unit, and a torch holder shifter for transferring a torch holder between the torch storing device and the torch changing unit.

Further, the torch storing device comprises a chain stretched across one pair of sprockets, and a plurality of forks disposed on an outer side of the chain for supporting the torch holder.

Moreover, the torch changing unit comprises two bases for supporting the torch holder, a position cylinder for driving the two bases in the Y-axis direction, and an elevating cylinder for elevating the torch holder in the Z-axis direction.

Further, the torch storing device comprises a structure capable of arbitrarily increasing the number of torches to be stored by extending the length of the chain on which the forks are disposed.

The laser beam machine according to the present invention having the above-mentioned structure can store a large number of torches and nozzles within a limited space and can efficiently change the torches and nozzles automatically.

DETAILED DESCRIPTION OF THE PREFERRED EMBODIMENTS

Figure 1:
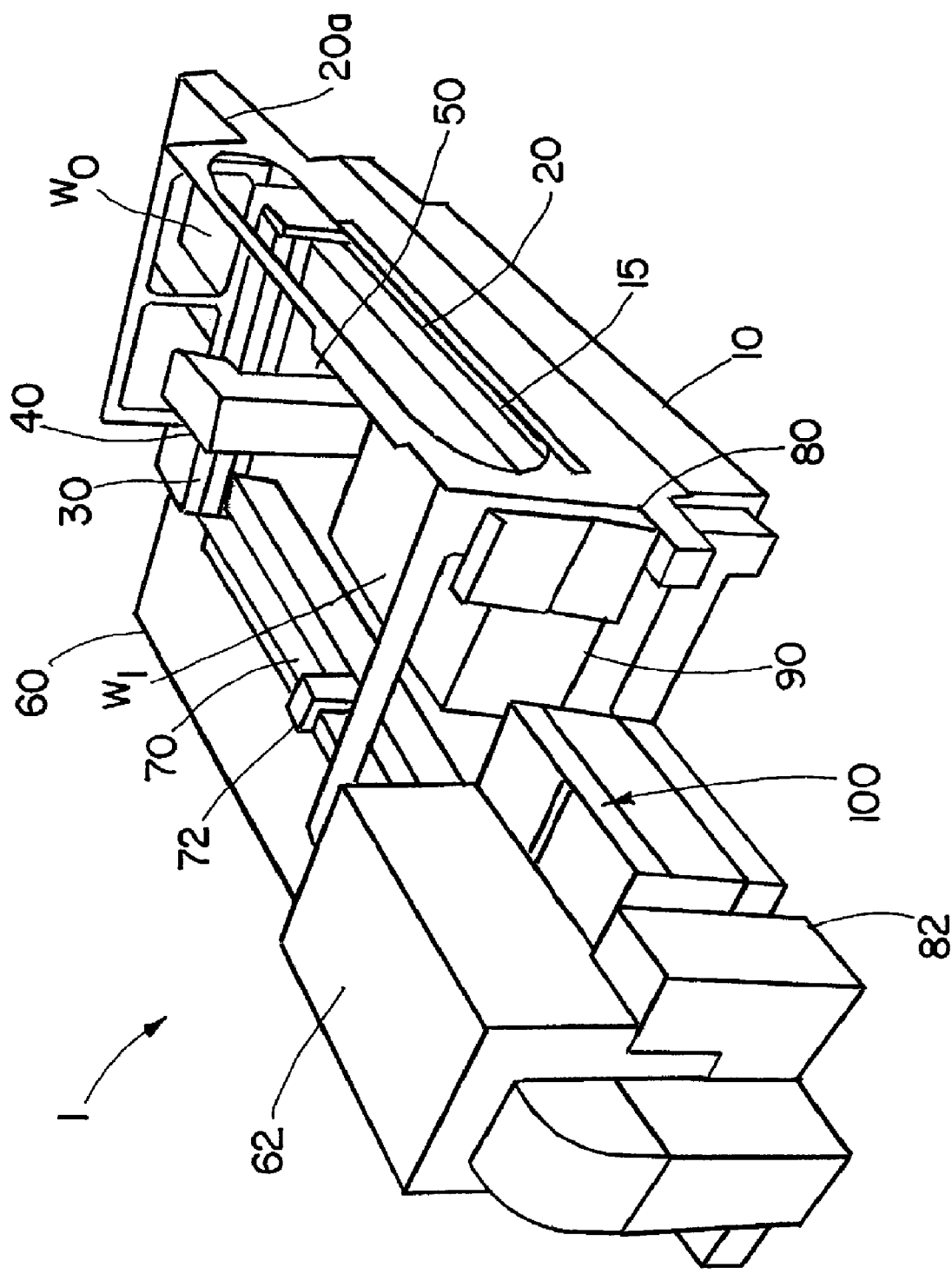
FIG. 1 is a perspective view of the laser beam machine for realizing the present invention.

FIG. 1 is a schematic view of the laser beam machine for realizing the present invention.

The laser beam machine denoted as a whole by reference number 1 has a table 15 disposed on a bed 10, with a pallet 20 placed thereon. A work $W_1$ subjected to processing is placed on the pallet 20. The laser beam machine is equipped with a pallet 20a to be exchanged, which is in a stand-by status having a work $W_0$ to be subjected to processing placed thereon.

Guides are disposed on both sides of the table 15, and a column 30 is disposed so as to be able to move arbitrarily in the X-axis direction. The column 30 is driven for example via a linear motor. On the column 30 is disposed a saddle 40 capable of moving arbitrarily in the Y axis direction. The saddle 40 is driven for example via a linear motor. On the saddle 40 is disposed a working head 50 capable of moving arbitrarily in the Z-axis direction.

On the side portions of the table 15 are disposed a laser oscillator 60 and an electric panel 62. The laser beam output from the laser oscillator 60 is conducted via an optical path 70 to the working head 50.

The laser beam machine has a so-called flying optics structure in which the working head 50 moves in three X- Y- and Z-axis directions, so the optical path length between the laser oscillator is constantly varied. Therefore, a mirror 72 moving along an axis parallel to the X axis, which is referred to as an U-axis, is disposed to provide a mechanism to reflect the laser beam in the optical path 70 so as to maintain a constant optical path length.

On the end portion of the bed 10 are disposed for example an NC device 80 and a management unit 82 having a function to communicate with the exterior.

A setup station 90 is disposed outside the processing area at the X-axis end of the table 15. The setup station is equipped with a mechanism for exchanging torches between the automatic tool changer and the working head, a nozzle changer, a focal position adjusting device for the replaced torch, and so on.

A torch storing device 100 is disposed to oppose to the setup station 90.

Figure 2:
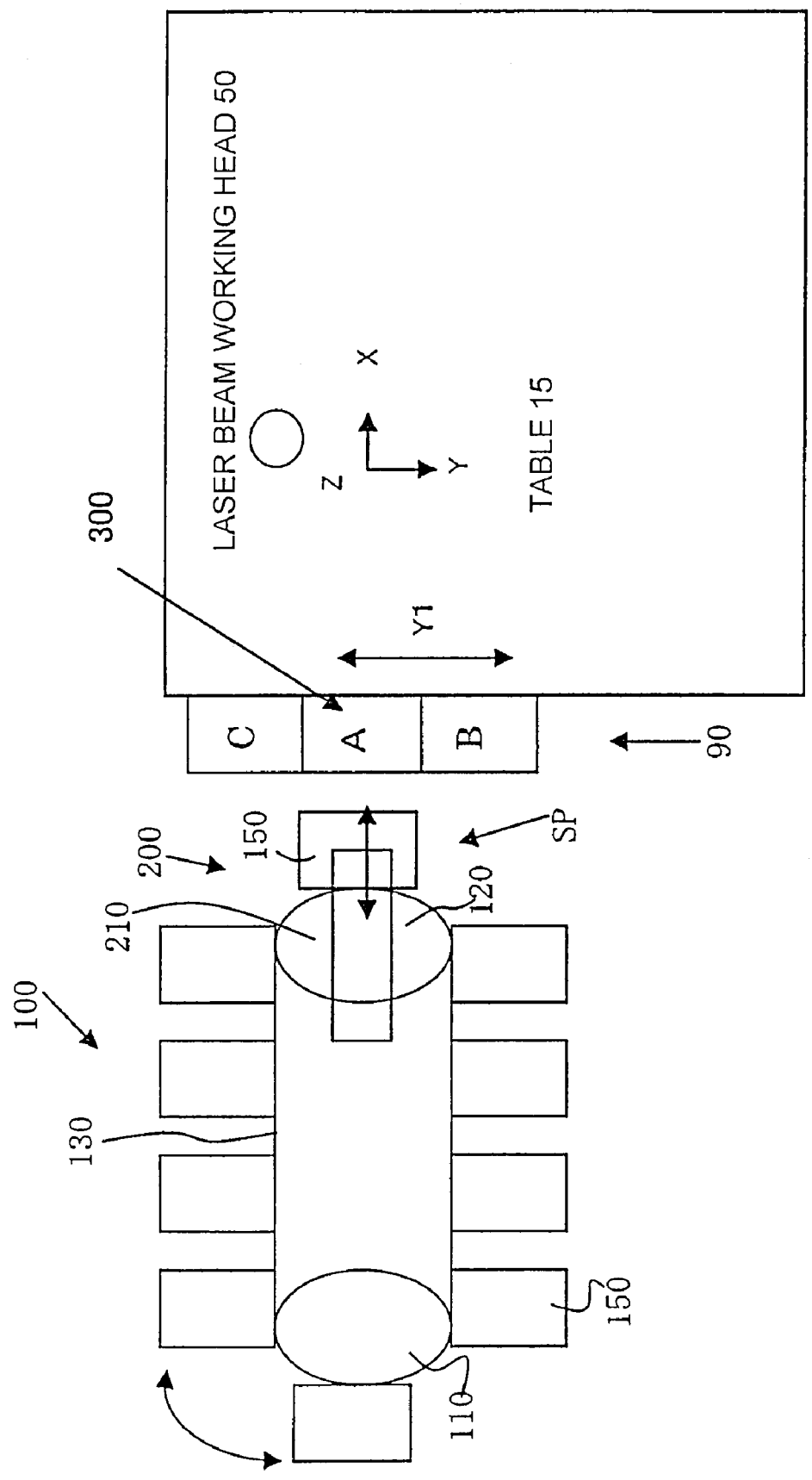
FIG. 2 is a plan view showing the arrangement of the laser beam machine body, the torch storing device and the torch holder shifter.

FIG. 2 is a plan view showing the arrangement of the laser beam machine body, the torch storing device 100 and a torch holder shifter 200.

A pallet mounting a work is prepared on the table 15, and the working head 50 moves in three X-, Y- and Z-axis directions with respect to the table 15 and performs laser machining.

The setup station 90 disposed on the X-axis end of the table 15 is equipped with a torch changing unit 300. The torch changing unit 300 can move along a $Y_1$ axis, which is parallel to the Y axis, between three positions, which are positions A, B and C, as shown in FIG. 2.

The torch storing device 100 stores a plurality of torch holders 150 around a chain 130 supported by sprocket wheels 110 and 120.

Figure 3:
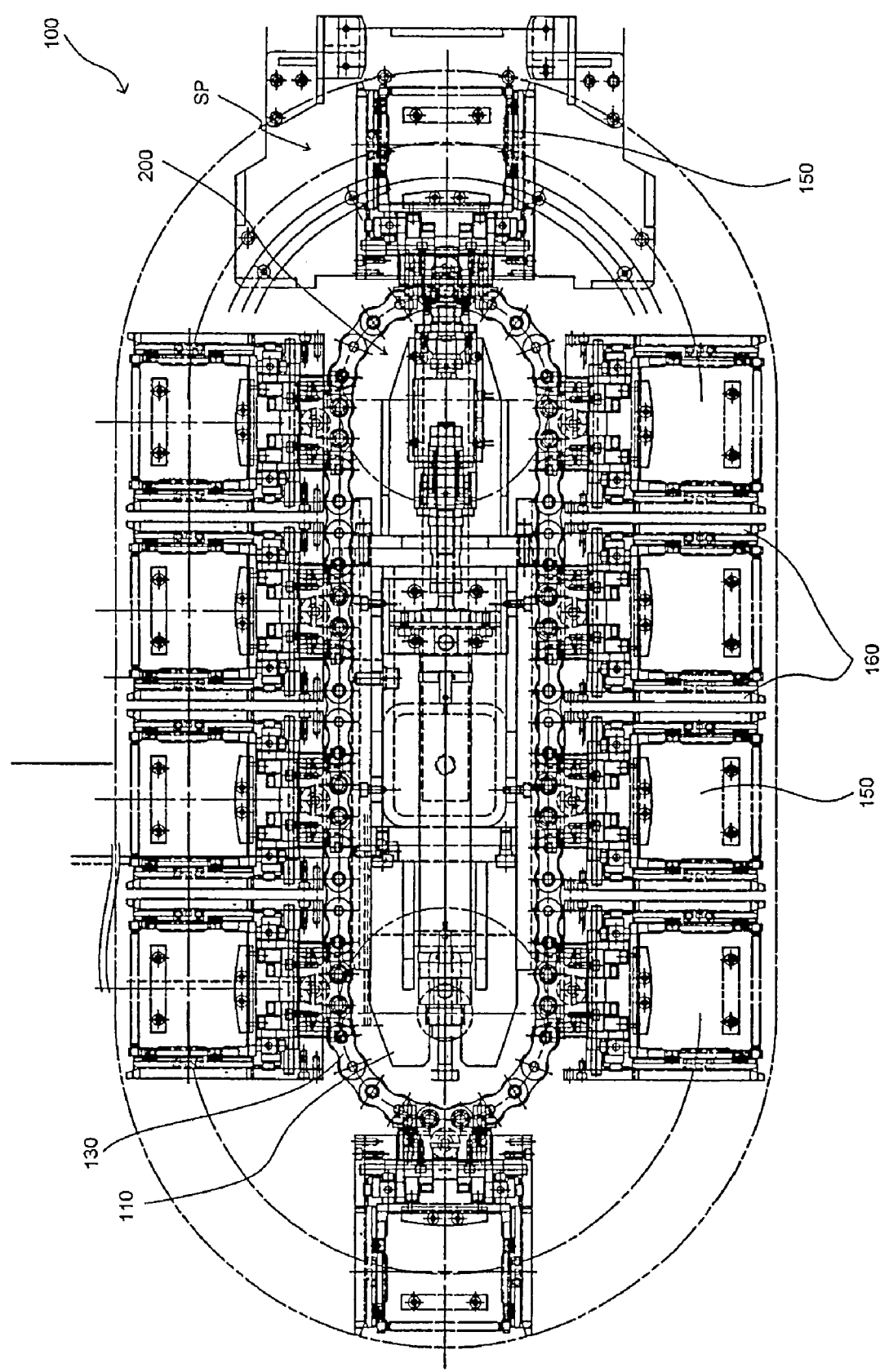
FIG. 3 is a plan view showing the detailed structure of the torch storing device.

FIG. 3 is a plan view showing the detailed structure of the torch storing device. In the illustrated embodiment, forks 160 are disposed for storing ten torch holders 150 on the outer circumference of the chain 130. Each torch holder 150 stores a torch, so a total of ten torches can be stored. The total length of the chain can be extended to form a torch storing device capable of storing a necessary number of torches, such as a torch storing device capable of storing twenty torches.

The torch holder 150 of the torch storing device 100 can be allocated to a shift position SP opposing to the torch changing unit 300. The torch holder shifter 200 disposed in the torch storing device 100 has a function to send out the torch holder at the shift position SP toward the torch changing unit 300 or to return the torch holder positioned near the torch changing unit 300 to a vacant fork 160.

Figure 4:
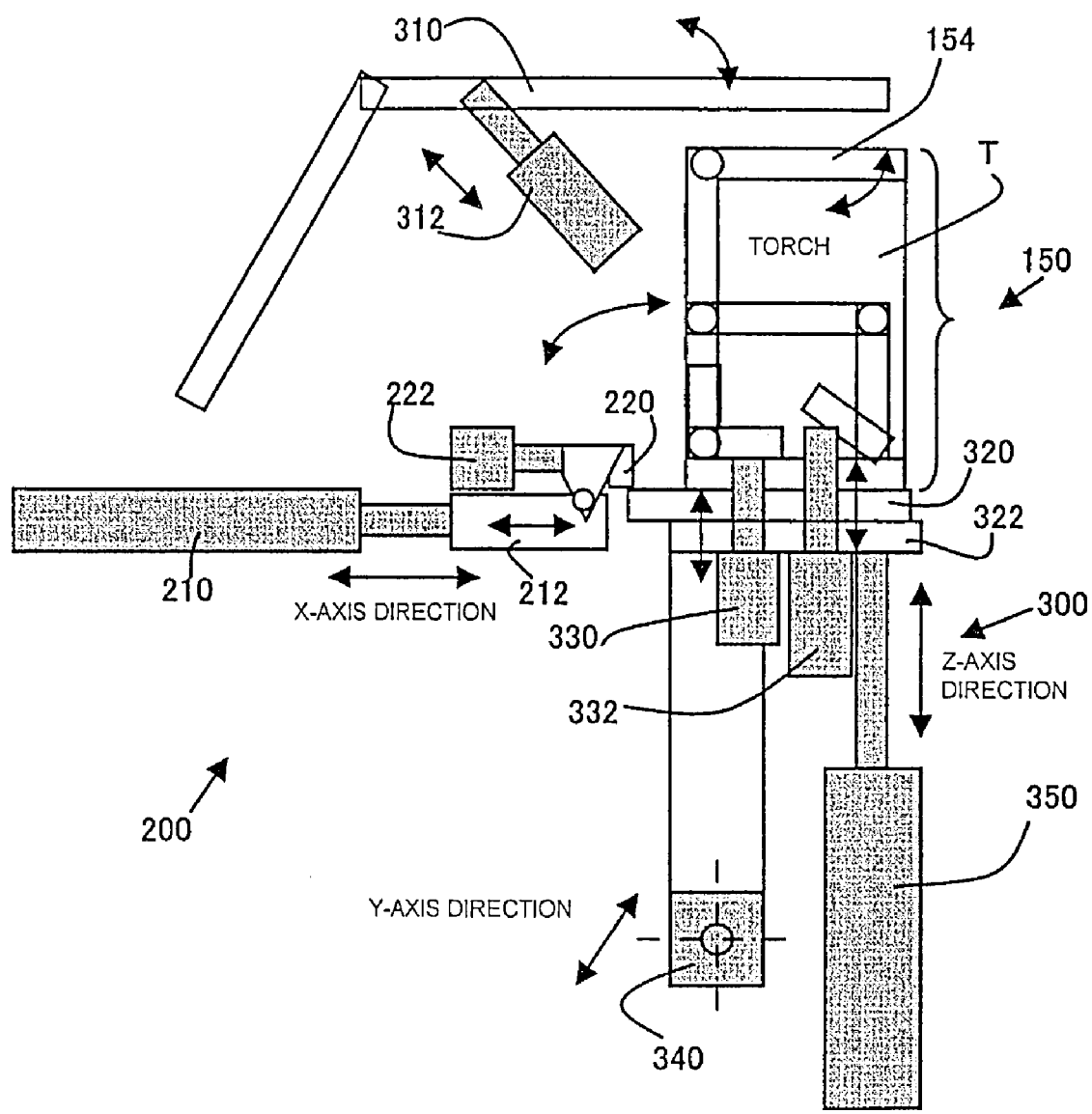
FIG. 4 is an explanatory view showing the structure of the torch changing unit and the torch holder shifter.

FIG. 4 is an explanatory view showing the structure of the torch changing unit 300 and the torch holder shifter 200.

The torch changing unit 300 has a cover 310 covering the whole body thereof, and the cover 310 is opened and closed via a cylinder 312.

The torch holder shifter 200 has a head 212 driven via a shift cylinder 210, and a jaw 220 disposed on the head 212 is driven by a cylinder 222.

The torch changing unit 300 has two bases 320 and 322, and is driven in a Y-axis direction perpendicular to the sheet plane via a position cylinder 340. By this movement, the base 320 and the base 322 are moved in reciprocating motion between position A and position C of FIG. 2.

Each base 320 and 322 is equipped with a cylinder 330 and 332 for opening the torch cover 154 of the torch holder 150, respectively. The bases 320 and 322 mounting the torch holder 150 is moved up and down in the Z-axis direction via an elevating cylinder 350.

FIGS. 5 through 10 are explanatory views showing the operation for automatically changing torches according to the present invention.

FIGS. 5 and 6 show the operation when the laser beam processing is being performed.

FIG. 5(a) shows the operation in which the torch holder 150 storing an already-used torch $T_1$ is moved to the torch changing position A. This operation is performed by driving the position cylinder 340 of the torch changing unit 300. The torch holder shifter 200 has a vacant fork 160 being in standby status positioned in the shift position SP.

Figure 5C:
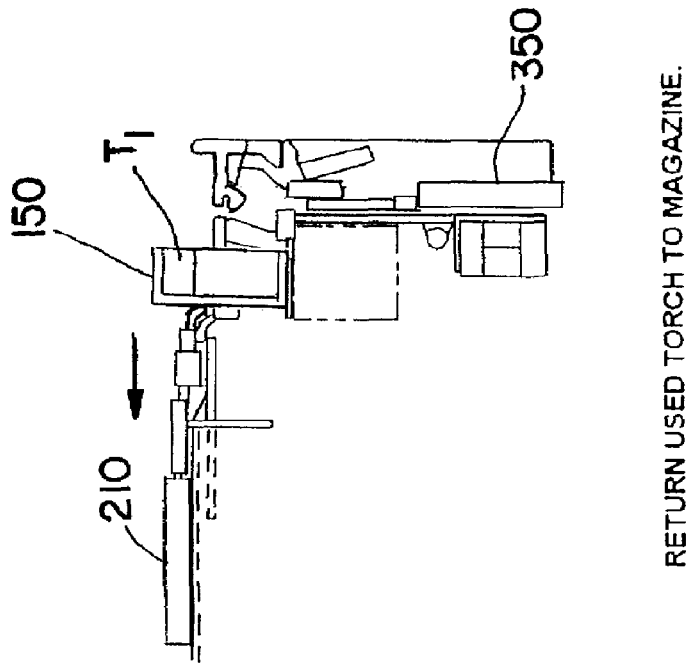
FIG. 5 is an explanatory view showing the automatic changing operation of torches according to the present invention.
Figure 5D:
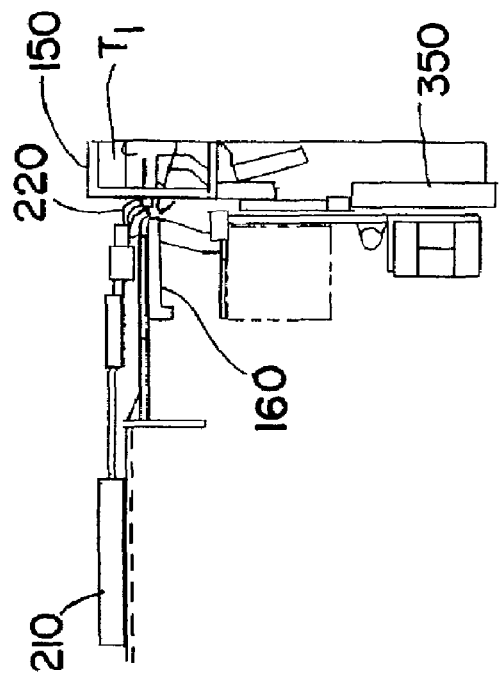

In FIG. 5(b), the shift cylinder 210 is driven to extend the head 212. In FIG. 5(c), the jaw 220 is operated to grip the torch holder 150 storing the used torch $T_1$, and in FIG. 5(d), the shift cylinder 210 contracts to return the torch holder 150 to the fork 160 having a vacant torch magazine.

Figures 6E, 6F:
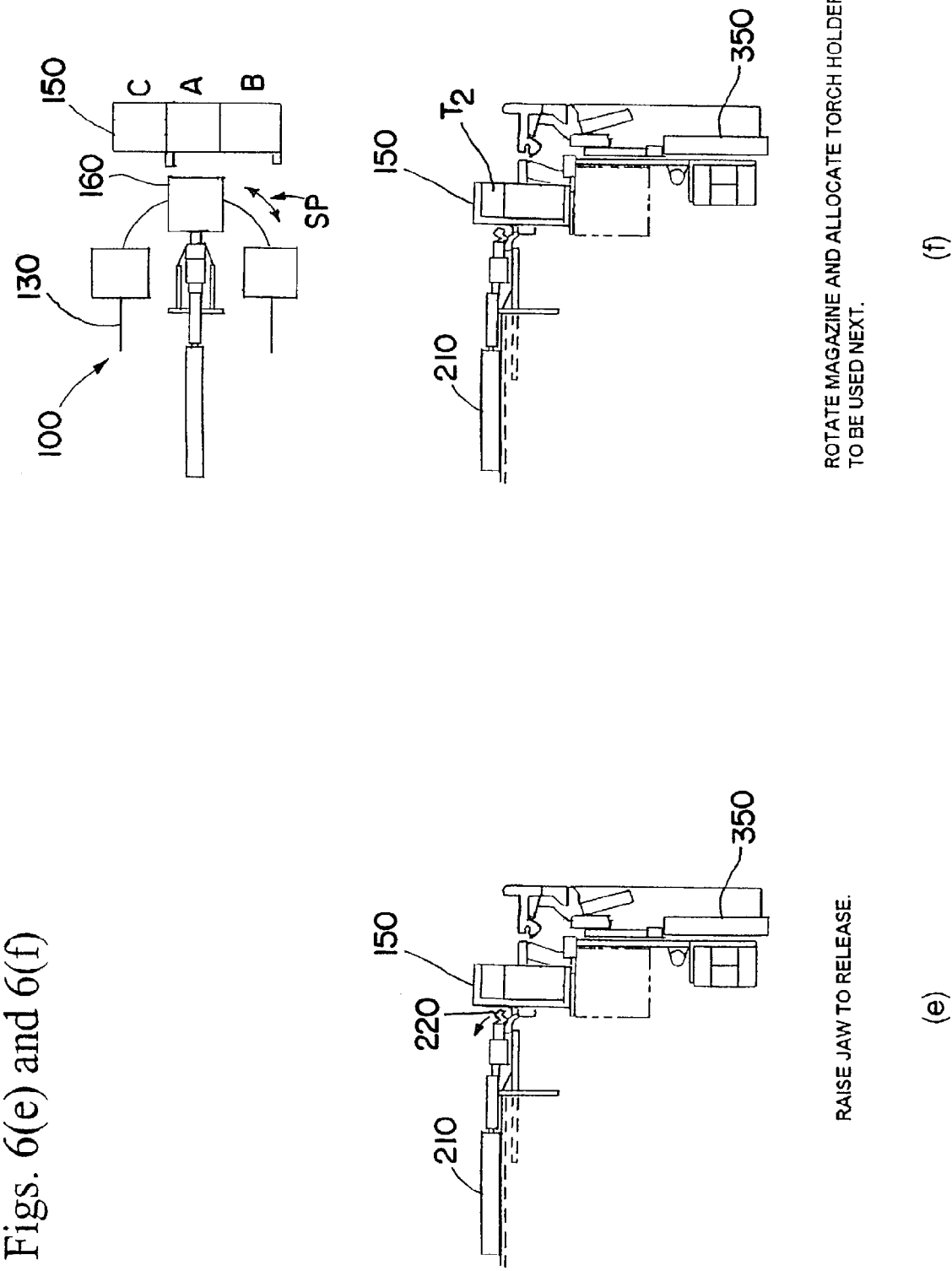
FIG. 6 is an explanatory view showing the automatic changing operation of torches according to the present invention.

In FIG. 6(e), the jaw 220 is opened to release the torch holder 150.

In FIG. 6(f), the chain 130 of the torch storing device 100 is driven to allocate to the shift position SP the torch holder 150 storing the torch $T_2$ to be used next.

In FIG. 6(g), the shift cylinder 210 is extended to set the torch holder 150 to the torch changing position A. In FIG. 6(h), the shift cylinder 210 is returned to standby position, and the position cylinder 340 moves the torch holder 150 storing the torch $T_2$ t be used next to position C for standby. In this state, a vacant torch holder is at standby at position A.

FIGS. 7 through 10 show the operation for stopping the laser processing operation to change the torch attached to the working head.

Figure 7I:
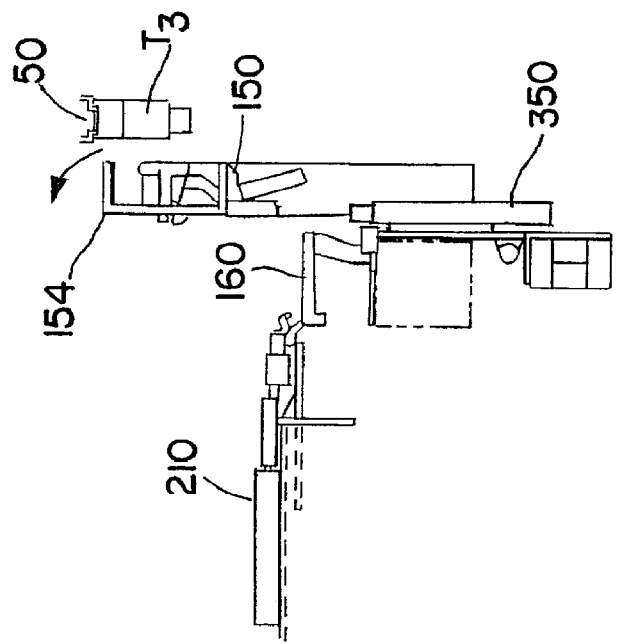
FIG. 7 is an explanatory view showing the automatic changing operation of torches according to the present invention.

FIG. 7(i) shows a state in which, upon receiving an order to change torches, the elevating cylinder 350 is activated and the vacant torch holder 150 at position A is elevated. The working head 50 having the already used torch $T_3$ attached thereto is moved to the torch changing position.

Figure 7J:
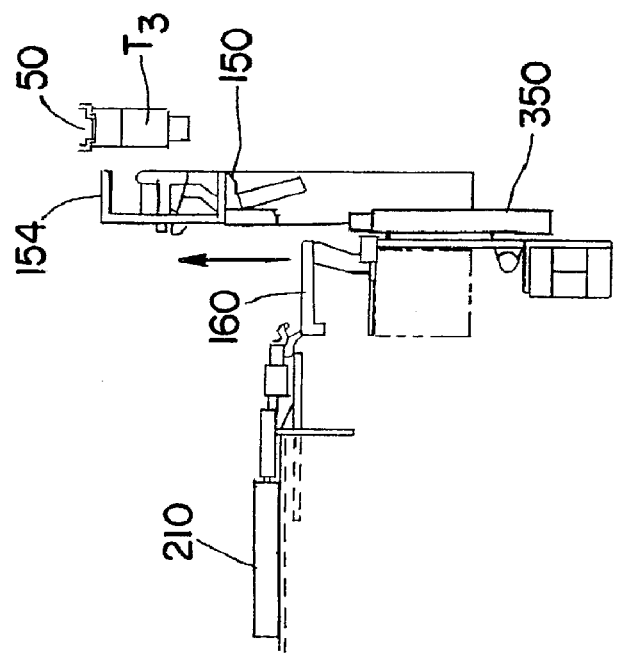
Figures 7K, 7L:
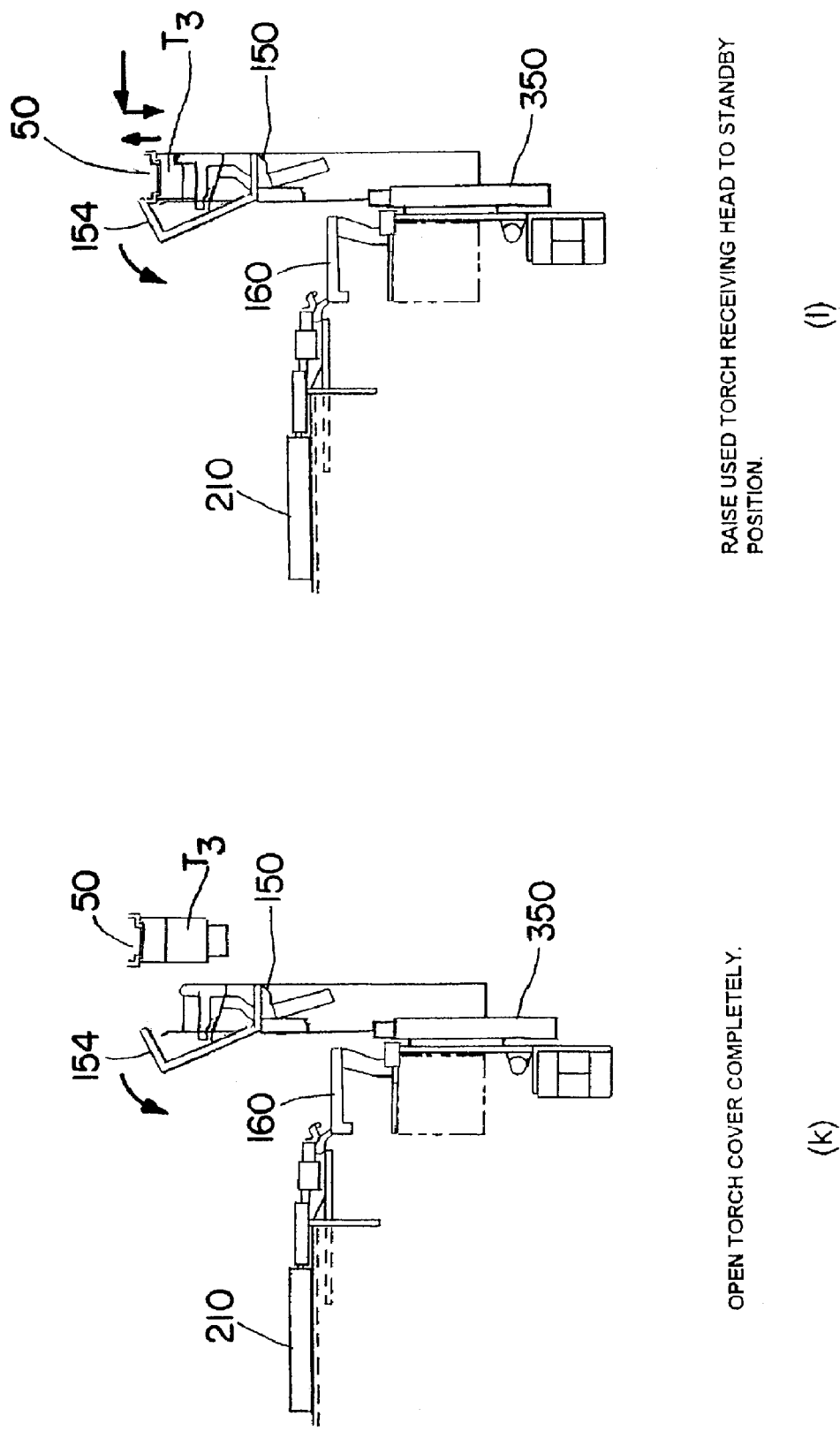

In FIG. 7(j), the cover 154 of the torch holder 150 is opened half way so as to prevent interference with the torch $T_3$, and in FIG. 7(k), the cover 154 is fully opened. In FIG. 7(l), the working head 50 moves above the torch holder 150 and receives the used torch $T_3$.

Figures 8M, 8N:
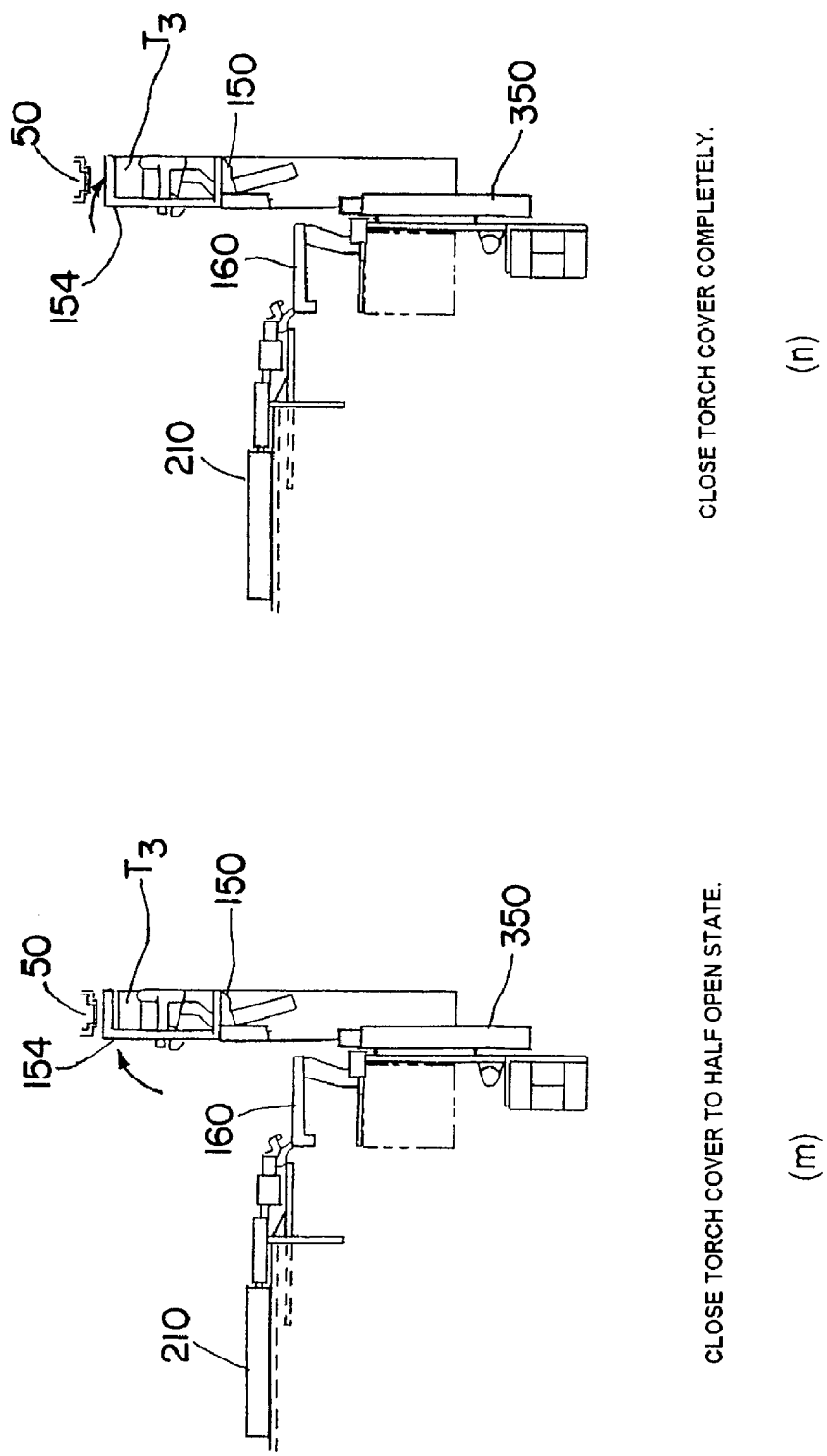
FIG. 8 is an explanatory view showing the automatic changing operation of torches according to the present invention.

In FIG. 8(m), the cover 154 of the torch holder 150 is closed to a half-opened state, and in FIG. 8(n), the cover 154 is fully closed. In FIG. 8(o), the cylinder 350 is operated to lower the torch holder 150.

In FIG. 8(p), the position cylinder 340 is operated and the torch holder 150 storing the torch $T_2$ to be used next is moved to position A.

Figures 9Q, 9R:
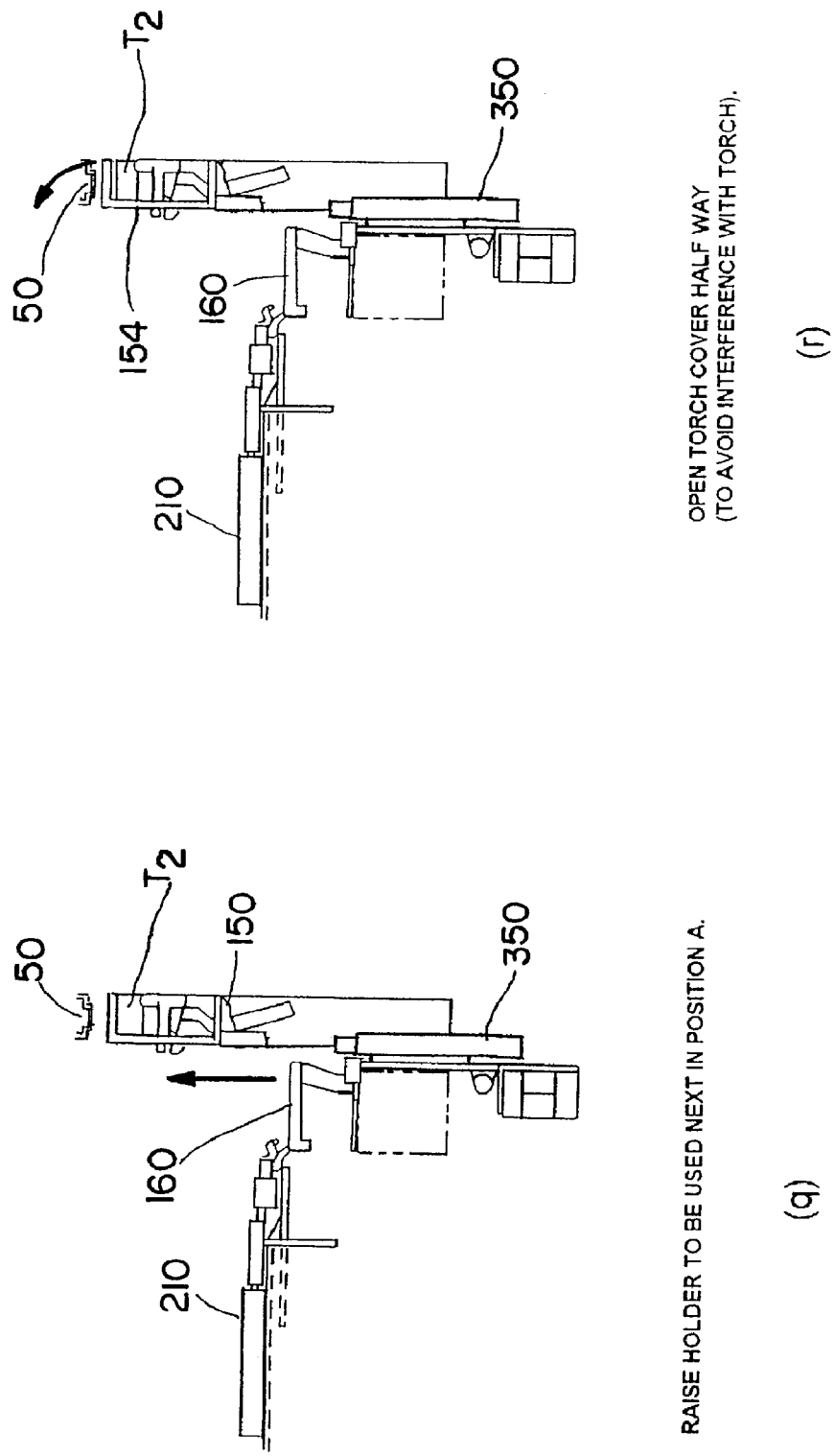
FIG. 9 is an explanatory view showing the automatic changing operation of torches according to the present invention.
Figures 9S, 9T:
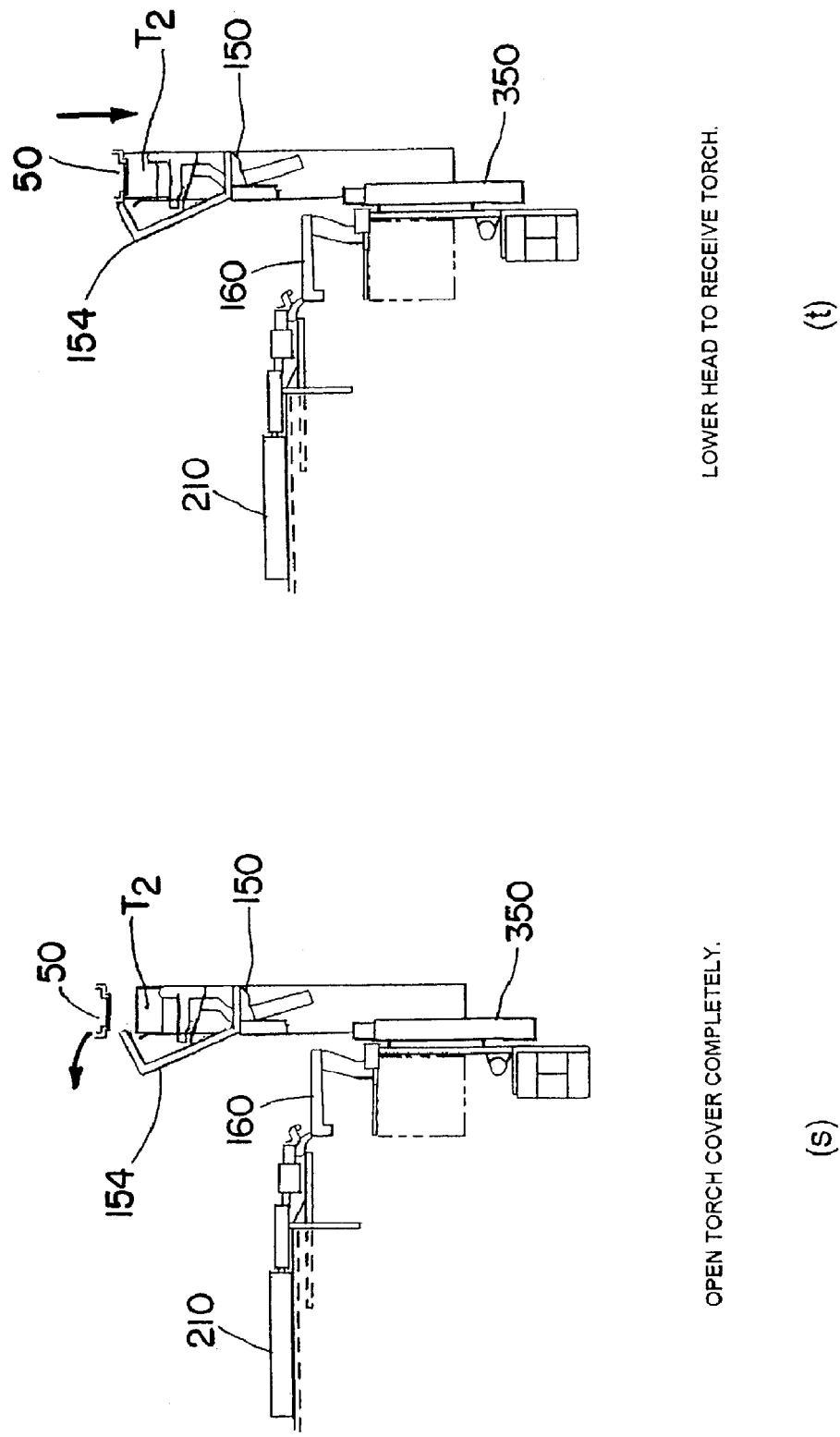

In FIG. 9(q), the torch holder 15 storing the torch $T_2$ to be used next is elevated, and in FIG. 9(r), the torch cover 154 is opened half way. In FIG. 9(s), the torch cover 154 is fully opened, and in FIG. 9(t), the working head 50 is lowered to receive the torch $T_2$.

Figure 10U:
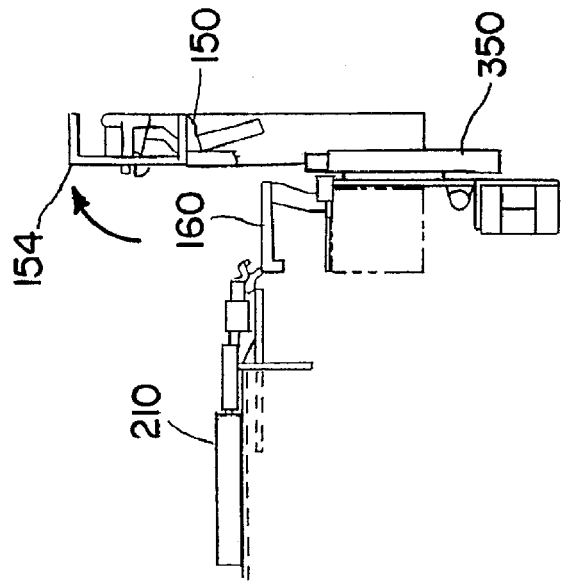
FIG. 10 is an explanatory view showing the automatic changing operation of torches according to the present invention.
Figure 10V:
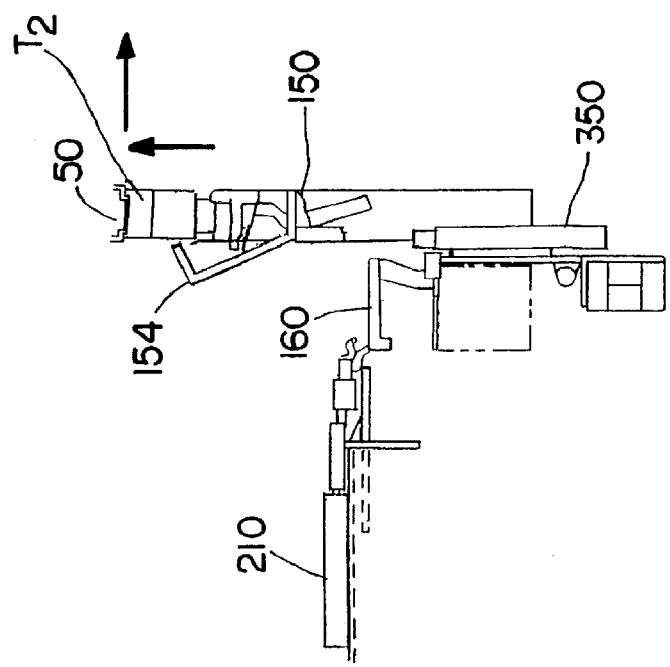
Figure 10W:
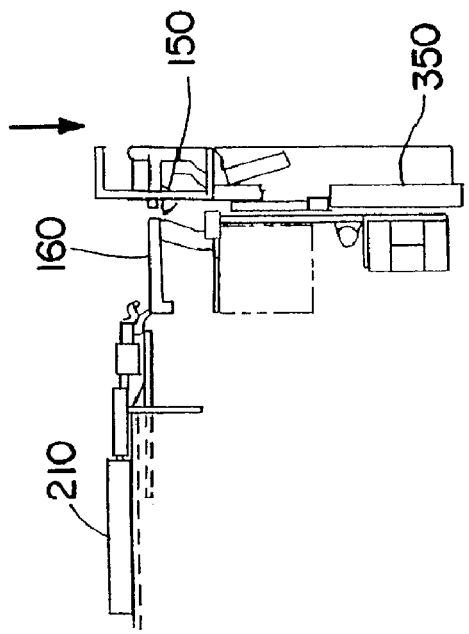
Figure 10X:
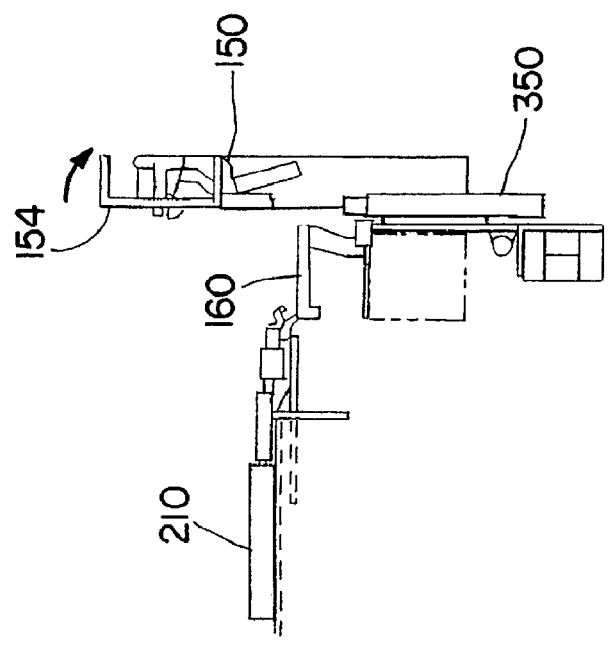

In FIG. 10(u), the working head 50 having the new torch $T_2$ attached thereto is moved to the processing position, and in FIG. 10(v), the torch cover is closed to a half-opened state. In FIG. 10(w), the torch cover 154 is fully closed, and in FIG. 10(x), the torch holder 150 is lowered to return to the initial state.

Figure 11:
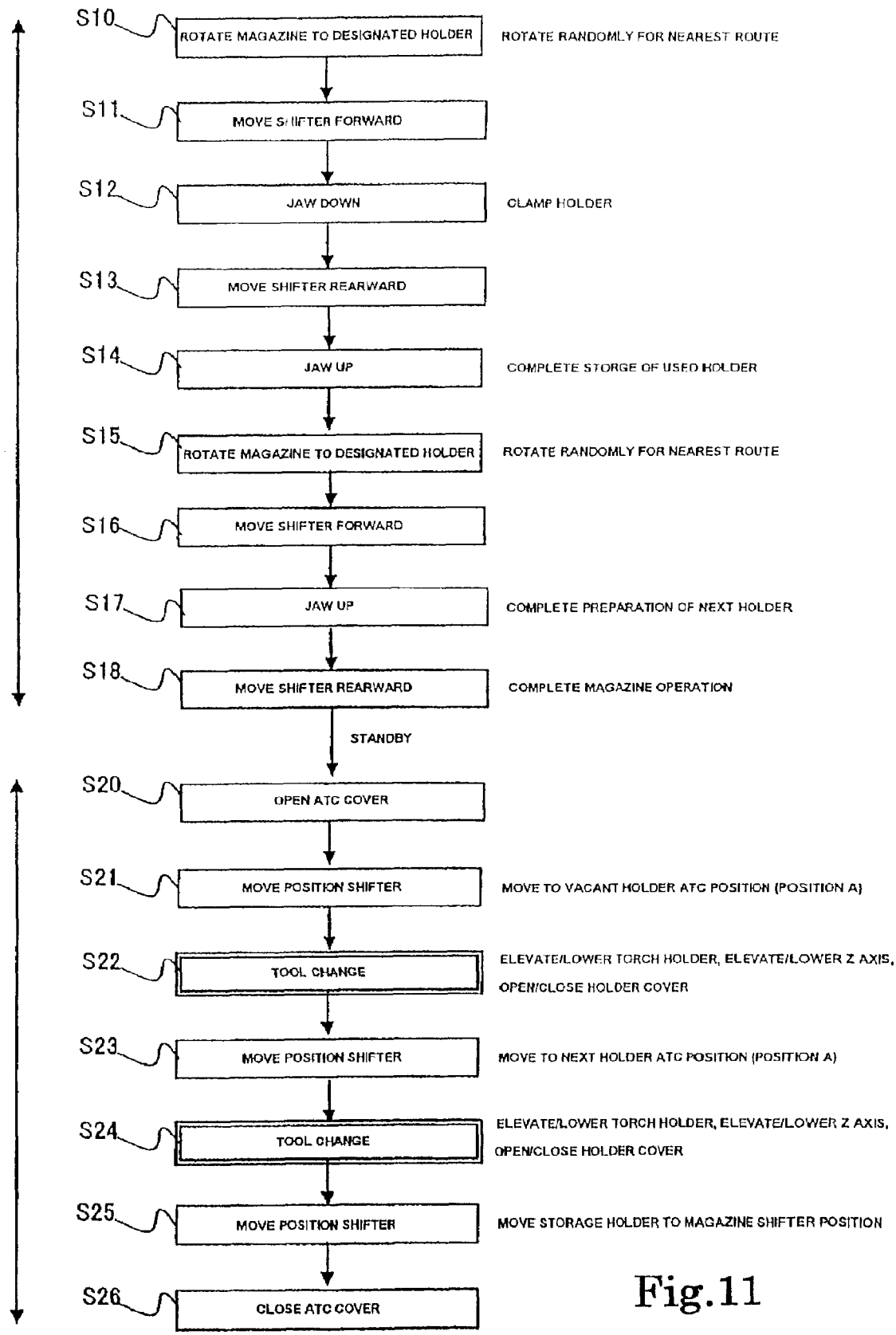
FIG. 11 is a flowchart showing the operation means of the automatic torch changer according to the present invention.

FIG. 11 is a flowchart showing the operating means of the automatic torch changer according to the present invention.

Steps S10 through S18 illustrate the operation during laser processing, and steps S20 to S26 illustrate the operation when the laser processing is stopped.

What is claimed is:

1. A laser beam machine comprising:
   a column disposed slidably on a bed and capable of moving along an X axis;
   a saddle supported by the column and capable of moving along a Y axis;
   a laser beam working head supported by the saddle and capable of moving along a Z axis;
   a torch changing unit disposed on an end portion of the bed outside a processing area;
   a torch storing device disposed adjacent to the torch changing unit in the X-Y plane; and
   a torch holder shifter for transferring in the X-Y plane a torch holder between the torch storing device and the torch changing unit.

2. A laser beam machine comprising:
   a column disposed slidably on a bed and capable of moving along an X axis;
   a saddle supported by the column and capable of moving along a Y axis;
   a laser beam working head supported by the saddle and capable of moving along a Z axis;
   a torch changing unit disposed on an end portion of the bed outside a processing area;

a torch storing device disposed adjacent to the torch changing unit; and a torch holder shifter for transferring a torch holder between the torch storing device and the torch changing unit;

wherein the torch storing device comprises a chain stretched across one pair of sprockets, and a plurality of forks disposed on an outer side of the chain for supporting the torch holder.

3. The laser beam machine according to claim 1, wherein the torch changing unit comprises two bases for supporting the torch holder, a position cylinder for driving the two bases in the Y-axis direction, and an elevating cylinder for elevating the torch holder in the Z-axis direction.

4. The laser beam machine according to claim 2, wherein the torch storing device comprises a structure capable of arbitrarily increasing the number of torches to be stored therein by extending the length of the chain on which the forks are disposed.

5. A laser beam machine comprising:

a column disposed slidably on a bed and capable of moving along an X axis;

a saddle supported by the column and capable of moving along a Y axis;

a laser beam working head supported by the saddle and capable of moving along a Z axis;

a torch changing unit disposed on an end portion of the bed outside a processing area;

a torch storing device disposed adjacent to the torch changing unit; and a torch holder shifter for transferring a torch holder between the torch storing device and the torch changing unit, wherein the torch holder shifter removes the torch holder held by the torch storing device from the torch storing device, and transfers the torch holder to the torch changing unit which in turn holds the torch holder.

* * * * *